United States Patent [19]

Mitsuhashi et al.

[11] Patent Number: 5,981,428
[45] Date of Patent: Nov. 9, 1999

[54] REVERSIBLY CHANGEABLE HEAT-SENSITIVE RECORDING MEDIUM

[75] Inventors: Hiroyuki Mitsuhashi, Kyoto; Kazushi Miyata, Mishima-gun; Kenji Kohno, Ibaraki; Takanori Kamoto; Yoshinori Yamamoto, both of Takatsuki, all of Japan

[73] Assignee: Hitachi Maxell, Ltd., Osaka-fu, Japan

[21] Appl. No.: 08/938,616

[22] Filed: Sep. 26, 1997

[30] Foreign Application Priority Data

Sep. 27, 1996 [JP] Japan ................................. 8-277248
Sep. 5, 1997 [JP] Japan ................................. 9-257627

[51] Int. Cl.$^6$ ........................................... B41M 5/40
[52] U.S. Cl. ........................ 503/200; 503/201; 503/226
[58] Field of Search .................. 427/150–152; 503/201, 200, 226; 428/690

[56] References Cited

FOREIGN PATENT DOCUMENTS 3-253388  11/1991  Japan ................................. 503/201
7-101186  4/1995  Japan ................................. 503/201

*Primary Examiner*—Bruce H. Hess
*Attorney, Agent, or Firm*—Birch, Stewart, Kolasch & Birch, LLP

[57] ABSTRACT

A reversibly changeable heat-sensitive recording medium comprising a heat-sensitive layer which comprises a support, and a resin matrix and a low molecular weight organic material dispersed inside the resin matrix, the transparency of which changes reversibly depending on the temperature and which is formed on a support, and, if necessary, including a protection layer or an intermediate layer prepared above the heat-sensitive layer or on the lower surface of the support layer or between the support layer and any other layer or between any other layers in the reversibly changeable heat-sensitive recording medium, characterized in that a fluorescent body which emits visible light through the excitement by visible light is included in at least a portion of the support body, heat-sensitive layer and, if necessary, any other layer. This medium has excellent visibility and can be used with backgrounds of any of many possible colors.

2 Claims, No Drawings

REVERSIBLY CHANGEABLE HEAT-SENSITIVE RECORDING MEDIUM

BACKGROUND OF THE INVENTION

1. Field of the Invention

The present invention relates to a reversibly changeable heat-sensitive recording medium which has a reversibly changeable heat-sensitive layer and heat-dependent transparency, and, based on temperature changes, can allow repeated recording and erasing. In further detail, the present invention relates to the aforementioned reversibly changeable heat-sensitive recording medium which has excellent visibility.

2. Description of the Prior Art

Previously, as heat-sensitive recording media for recording or erasing reports on plastic, there were media having a heat-sensitive layer which comprises resin matrices such as polyvinyl chloride, polyester, polyamide, etc., containing higher alcohols, low molecular weight higher fatty acids dispersed in the matrix. Images are formed or erased through the use of the reversibly changeable temperature dependent transparency changes from transparent to opaque or from opaque to, transparent.

In this type of heat-sensitive recording medium, there is a large difference between the light-scattering strength of the opaque and transparent portions and the visibility of the recorded portions is good. Attempts have made to increase the difference between the light-scattering strength of the opaque and transparent portions by changing the matrix, low molecular weight organic material composition or the thickness of the heat-sensitive layer, by increasing the light-scattering strength of the opaque portion, by controlling the conditions of the low molecular weight compound dispersed in the matrix, and by lowering the light-scattering strength of the background of the transparent portion, as a process for obtaining good visibility. (See Japanese Patent A-Publication Nos. 54-119377 (1979), 55-154198 (1980), and 64-14077 (1989).) However, in these processes the materials, heat-recording equipment, and manufacturing method were all fixed and the improvement in the visibility was limited.

In recent years, a process to improve the visibility has been proposed whereby a fluorescent dye is added to the heat-sensitive layer and the protection layer prepared on top of the heat-sensitive layer, etc. (See Japanese Patent A-Publication Nos. 3-253388 (1991), 7-101186 (1995).)

However, when using materials which absorb UV radiation in the protective layer prepared on the top of the heat-sensitive layer, the efficacy of the fluorescent body which has an excitation wavelength in the ultraviolet region deteriorates. Furthermore, when the background is made of the material which has light scattering strength of the same order as the opaque portions, the difference between the light-scattering strength of the opaque portions and the transparent portions is reduced and there is a disadvantage in that the visibility decreases.

SUMMARY OF THE INVENTION

Because the present invention gives model results by including a fluorescent body which emits visible light through excitement by visible light in one portion of, or all of, the support material, heat-sensitive layer, or any other necessary layers which make up the reversibly changeable heat-sensitive recording medium, the difference between the light-scattering strength between the opaque and transparent portions is large and the visibility is good and the reversibly changeable heat-sensitive recording medium may be used with backgrounds of any of many possible colors.

The reversibly changeable heat-sensitive recording medium of this invention comprises a reversibly changeable heat-sensitive recording medium comprising a heat-sensitive layer which comprises a support, and a resin matrix and a low molecular weight organic material dispersed inside the resin matrix, the transparency of which changes reversibly depending on the temperature and which is formed on a support and, if necessary, including a protection layer or an intermediate layer prepared above the heat-sensitive layer or on the lower surface of the support layer or between the support layer and any other layer or between any other layers in the reversibly changeable heat-sensitive recording medium characterized in that a fluorescent body which emits visible light after excitement by visible light is included in at least a portion of the support body, heat-sensitive layer and, if necessary, any other layer.

DETAILED DESCRIPTION OF THE INVENTION

In this invention, the fluorescent body contained in the heat-sensitive layers, etc., of the reversibly changeable heat-sensitive recording medium are fluorescent bodies which are excited by visible light and emit visible light and are not fluorescent bodies of the prior art which have excitation wavelengths in the ultraviolet region. For this, even if materials which absorb UV radiation, such as acrylic resins, are used in the protective layer on top of the heat-sensitive layer, or even if fluorescent materials are contained in layers made of materials which absorb UV radiation such as acrylic type resins, the emission efficacy does not deteriorate and satisfactory results can be obtained even inside a room having little UV radiation. Furthermore, the difference between the light-scattering strength of the opaque portions and the transparent portions increases, when the background has the light-scattering strength similar to the opaque portions.

Therefore, when a fluorescent body which emits visible light after being excited by visible light is contained in the heat-sensitive layer, etc., of the reversibly changeable heat-sensitive recording medium, then the emitting efficiency improves, the difference between the light-scattering strength of the opaque and transparent portions increases, the visibility improves, and a reversibly changeable heat-sensitive recording medium which can be used with backgrounds of any of many possible colors can be obtained.

This type of fluorescent body preferably emits visible light which shows sufficient scattering in the opaque portion of the reversibly changeable heat-sensitive recording medium, and which is in the wavelength range where visibility improves. Specifically, materials which emit radiation in the visible region of not less than 4,000 Å and not more than 9,000 Å are preferable. Furthermore, the wavelength of the exciting light will depend on the transparency of the materials in each of the layers of support body, heat-sensitive layer and any other necessary portions and is preferably in the region of not less than 3,000 Å and not more then 8,000 Å.

Specific examples of this type of fluorescent body which emits visible light after being excited by visible light are perylene types such as Lumogen F Yellow 083, Lumogen F Orange 240 and Lumogen F Red 300; naphthylimide types such as Lumogen F Violet 570 (all sold by BASF). Furthermore, the fluorescent body of this invention is not limited to the above and any of various types may be used.

This type of fluorescent body which emits visible light after being excited by visible light may be contained, not only in the heat-sensitive layer of the reversibly changeable heat-sensitive recording medium, but also in the support of the reversibly changeable heat-sensitive recording medium. Furthermore, when, if necessary, protective layers or intermediate layers, etc., are prepared on top of the heat-sensitive layer, on the upper surface of the support body, or between the support body and each layer, it may be contained in any of these layers. Also, not only may it be contained in the support body, the heat-sensitive layer or any other layer that may be required, it may also be contained in a plurality of optional layers.

In this way, when a fluorescent body which emits visible light after being excited by visible light is contained in a portion of, or all of, the support body, heat-sensitive layer, or any other necessary layer making up the reversibly changeable heat-sensitive recording medium, the fluorescent body content is preferably not less than 0.001% and not more than 10%. To obtain sufficient fluorescent efficacy not less than 0.01% should be used, and for efficient fluorescent effects, not less than 1% is more favorable. Furthermore, as the conditions of the contained fluorescent body, any condition is possible, but it is preferably contained in an evenly dispersed state as a solution or powder.

The heat-sensitive layer is a layer in which the transparency changes reversibly depending on the temperature. It is formed by mixing a thermally soluble low molecular weight organic material together with a resin matrix, solvents, a fluorescent body which emits visible light after being excited by visible light, and any other necessary components, applying a prepared composition on the top of the support and drying it. When the heat-sensitive layer formed in this way is heated with a thermal head or a heating drum, then the thermally soluble low molecular weight organic materials dissolve into the resin matrices and they mutually blend to form a uniform film and the particle surfaces which scatter light lose their effect and it becomes transparent.

As the resin matrix to be used in the heat-sensitive layer, there are those forming a layer in which low molecular weight organic materials are evenly dispersed. In order to increase the influence of the transparency of the recording layer when transparent, a resin which has high transparency and excellent mechanical stability as well as good film-making properties is preferred.

Examples of this type of resin are poly vinyl chloride; vinyl chloride copolymers such as vinyl chloride/vinyl acetate copolymer, vinyl chloride/vinyl acetate/vinyl alcohol copolymer, vinyl chloride/vinyl acetate/acrylic copolymer, vinyl chloride/acrylate copolymer, and the like; polyvinylidene chloride; vinylidene copolymers such as vinylidene chloride/vinyl chloride copolymer, vinylidene chloride/acrylonitrile copolymer, and the like; and other thermoplastic resins such as polyester, polyamide, polyacrylate or polymethacrylate, acrylate/methacrylate copolymer, silicone resin, polystyrene, styrene/butadiene copolymer, and the like; or any other thermosetting resin. These materials may be used individually or in a combination of two or more.

Furthermore, the low molecular weight organic material used in the heat-sensitive layer preferably has a melting point of not less than 50° C. If it has a melting point of less than 50° C., then it becomes unstable at room temperature and the amount of energy needed for recording will change during preservation For this, the range of energy for transparency shifts and it becomes impossible to erase the image with the available energy.

As this type of low molecular weight organic material, aliphatic ketones having a melting point of not less than 50° C., higher fatty acids and esters, sulphides, aliphatic dicarbonic acids, saturated and non-saturated fatty acid bisamide, saturated or non-saturated aliphatic ureas along with aromatic ureas, or solid solutions of these components can be used. Herein, the solid solutions are those comprising two or more mutually dissolved solid components, and formed when the components have close crystal structures. With aliphatic compounds, the solid solution may occur when they have substantially the same chain lengths.

Examples of aliphatic ketones with a melting point of not less than 50° C. are general dialkyl ketones having a formula of $$CH_3(CH_2)_{n-1}CO(CH_2)_{n-1}CH_3 \ (n \geq 8)$$

A specific example is stearone in which n is 16. Further examples are methylalkyl ketones with a general formula of $$CH_3CO(CH_2)_{n-3}CH_3 \ (n \geq 17)$$

and phenyl alkyl ketones with a general formula of $$C_6H_5CO(CH_2)_{n-3}CH_3 \ (n \geq 10).$$

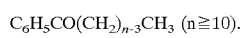

Examples of higher fatty acids are myristic acid, pentadecyl acid, palmitic acid, margaric acid, stearic acid, nonadecanoic acid, eicosanoic acid, heneicosanoic acid, behenic acid, lignoceric acid, pentacosanoic acid, cerotic acid, heptacosanoic acid, montanic acid, triacontanoic acid, nonacosanoic acid, melissic acid, trans-2-octadecenoic acid, trans-4-octadecenoic acid, 2-heptadecenolc acid, trans-gondoinic acid, brassidic acid, trans-8-trans-10-octadecadienoic acid, and so on.

Examples of higher fatty acid esters are the following methyl esters and ethyl esters and higher alcohol esters of fatty acids. Examples of methyl esters and ethyl esters of fatty acids are methyl behenate, methyl tricosanoate, ethyl tricosanoate, methyl lignocerate, ethyl lignocerate, methyl pentacosanoate, ethyl pentacosanoate, methyl cerotate, ethyl cerotate methyl octacosanoate, ethyl octacosanoate, methyl montanate, ethyl montanate, methyl melissate, ethyl melissate, methyl dotriacontanoate, ethyl dotriacontanoate, methyl tetratriacontanoate, ethyl tetratriacontanoate, methyl hexatriacontanoate, ethyl hexatriacontanoate, methyl octatriacontanoate, ethyl octatriacontanoate, methyl hexatetracontanoate, ethyl hexatetracontanoate, pentadecyl palmitate, hexadecyl palmitate, octadecyl palmitate, triacontyl palmitate, tetradecyl stearate, hexadecyl stearate, heptadecyl stearate, octadecyl stearate, hexacosyl stearate, triacontyl stearate, docosyl behenate, tetracosyl lignocerate, myristyl melissate, and the like.

An example of an ester of a higher alcohol is a phthalic acid mono ester of a primary alcohol having 12 or more carbon atoms.

As a sulphide, those of the following general formula may be given as examples:

$$HOOC(CH_2)_m-S-(CH_2)_n COOH$$

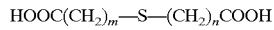

(provided that m and n are each an integer between 1 and 5)

Specific examples are (1,1'-dicarboxyl)dimethyl sulphide, (2,2'-dicarboxyl)diethyl sulphide, thiodipropionic acid, (3,3'-dicarboxyl)dipropyl sulphide, (1,2'-dicarboxyl) methylethyl sulphide, (1,4'-dicarboxyl)methylbutyl sulphide, (2,3'-dicarboxyl)ethylpropyl sulphide, (2,4'-dicarboxyl)ethylbutyl sulphide, (5,5'-dicarboxyl) dipentyl sulphide, and the like. Thiodipropionic acid is preferred.

Furthermore, a general formula for aliphatic dicarbon acids can be given as

HOOC(CH$_2$)$_{n-2}$COOH  (n≧2)

Specific examples are oxalic acid, malonic acid, succinic acid, glutaric acid, adipic acid, pimelic acid, suberic acid, azelaic acid, sebacic acid, undecandioic acid, dodecandioic acid, tridecandioic acid, tetradecandioic acid, pentadecandioic acid, hexadecandioic acid, heptadecandioic acid, octadecandioic acid, nonadecandioic acid, eicosandioic acid, heneicosandioic acid, docosandioic acid, tetracosandioic acid, hexacosandioic acid, nonacosandioic acid, dotriacosandioic acid, and the like.

Furthermore, examples of saturated fatty acid bis-amides are methylene bis-stearic acid amide, ethylene bis-capric acid amide, ethylene bis-lauric acid amide, ethylene bis-stearic acid amide, ethylene bis-isostearic acid amide, ethylene bis-hydroxystearic acid amide, ethylene bis-behenic acid amide, hexamethylene bis-stearic acid amide, hexamethylene bis-hydroxystearic acid amide, N,N'-distearyl adipic acid amide, N,N'-distearyl sebacic acid amide, and the like.

Furthermore, examples of unsaturated fatty acid bis-amides are ethylene bis-oleic acid amide, hexamethylene bis-oleic acid amide, N,N'-dioleyl adipic acid amide, N,N'-dioleyl sebacic acid amide, and the like.

Examples of aromatic bis-amides are m-xylene bis-stearic acid amide, N,N'-distearyl isophthalic acid amide, and the like.

Furthermore, examples of saturated aliphatic ureas are N-methyl-N'-stearylurea, N-butyl-N'-stearylurea, and the like. An example of an saturated aliphatic bis-urea is hexamethylene bis-stearylurea or the like.

Additionally, examples of unsaturated aliphatic ureas are N-methyl-N'-oleylurea, N-butyl-N'-myristylurea, and the like. Examples of unsaturated aliphatic bis-ureas are hexamethylene bis-oleylurea, hexamethylene bis-palmitoleylurea, hexamethylene bis-myristoleylurea, or the like.

Examples of aromatic ureas are N-phenyl-N'-stearylurea, and the like. Examples of aromatic bis-ureas are xylene bis-stearylurea, toluylene bis-stearylurea, diphenylmethane bis-stearylurea, diphenylmethane bis-laurylurea, or the like.

This type of heat-sensitive layer preferably has a thickness of 1 to 20 μm. With a thickness of less than 1 μm, a sufficiently opaque condition cannot be obtained. With a thickness of greater than 20 μm, a sufficiently transparent condition cannot be obtained.

Additionally, when a protective layer is formed on top of the heat-sensitive layer, this protective layer is transparent and made by mixing resins in cross-linking agents, solvents, a fluorescent body which emits visible light after being excited by visible light, antistatic agents and any other necessary components to give a coating material for the protective layer which is then coated on the heat-sensitive layer and dried. This protective layer is formed on top of the heat-sensitive layer, and the heat-sensitive layer is sufficiently protected by the protective layer. It is thus difficult to damage the heat sensitive layer, even if other materials touch it, and there is an improvement in the flaw resistance. Also, as long as there is no change in the influences on the state of the heat sensitive layer, there is no reason why there should be any problem reading the image applied to the medium.

Besides the protective layer, if necessary, intermediate layers may be prepared by mixing solvents, fluorescent bodies which emit visible light after being excited by visible light, dyestuffs, colorings anti-electrical agents, and any other necessary components into the resin to make a coating material which is then applied to the underside of the support body, the support body or between each of the layers and then dried.

Furthermore, other materials, such as plasticizers, lubricants, dispersants or other resins that may be required to provide particular properties, can be used in the heat-sensitive layer, protective layer, or intermediate layer.

Furthermore, as the support which is prepared for the heat-sensitive layer, etc., polyester, polystyrene, polymethacrylate, polycarbonate, cellophane, cellulose acetate, or other transparent plastic sheet is preferred. The fluorescent body which emits visible light after being excited by visible light can be included by addition during the blending in of the other components when the support material is being made. When using a support material which contains this type of fluorescent body, the visibility becomes better and it becomes possible to use backgrounds of any of many possible colors.

EXAMPLES

The invention will be explained by the following examples.

Example 1

| Component | Parts by weight (pbw) |
|---|---|
| stearone | 7.5 |
| eicosandioic acid | 0.25 |
| hexamethylene bis-stearyl acid amide | 0.25 |
| vinyl chloride/vinyl acetate/hydroxypropyl acrylate copolymer* | 16 |
| pentadiene copolymer** | 0.16 |
| Colonate HL*** | 1.1 |
| anon (cyclohexanone) | 18.75 |
| methyl isobutyl ketone | 17.75 |
| toluene | 38.24 |
| fluorescent dyestuff**** | 0.05 |

*Trade name SOLBINE TA-2, manufactured by Nissei Chemical Industries Ltd.
**Trade name QUINTON B-170, manufactured by Zeon Co., Ltd
***Isocyanate cross-linking agent, manufactured by Nippon Polyurethane Co., Ltd.
****Trade name Lumogen F Red 300, manufactured by BASF)

The above ingredients were blended and dispersed in a small mixing vessel to produce a heat-sensitive coating material.

Then, the obtained heat-sensitive coating material was applied to the top of a 100 μm thick transparent polyester film with a wire bar, and then dried in a furnace to give a 20 μm thick heat-sensitive layers which was cured at 60° C. for 24 hours to produce a reversibly changeable heat-sensitive recording medium.

Example 2

A reversibly changeable heat-sensitive recording medium was prepared in the same manner as in Example 1 only the heat-sensitive layer was made in a thickness of 10 μm.

Example 3

A reversibly changeable heat-sensitive recording medium was prepared in the same manner as in Example 1 only the fluorescent dyestuff used in the heat-sensitive layer of Example 2 (Lumogen F Red 300, manufactured by BASF) was replaced by another dyestuff (Lumogen F Yellow 083, also manufactured by BASF).

Example 4

A heat-sensitive layer was prepared in the same manner as Example 2, and an intermediate layer was prepared by blending and dispersing the following components in a small mixing vessel:

| Component | Parts by weight (pbw) |
|---|---|
| vinyl chloride/vinyl acetate/hydroxypropyl acrylate copolymer* | 15 |
| Colonate HL** | 1.00 |
| MIBK | 42.5 |
| toluene | 42.5 |

*Trade name SOLBINE TA-2, manufactured by Nissei Chemical Industries Ltd.
**Isocyanate cross-linking agent, manufactured by Nippon Polyurethane Co., Ltd.

Then, the obtained intermediate layer coating material was applied on top of the heat-sensitive layer with a wire bar, and then dried in a furnace to give a 3 μm thick intermediate layer, which was cured at 60° C. for 24 hours.

Separately, a protective layer coating material was prepared by blending and dispersing the following components in a small mixing vessel:

| Component | Parts by weight (pbw) |
|---|---|
| acrylic type ultraviolet curing resin* | 20 |
| toluene | 80 |

*Trade name HARDIC RC-5704, manufactured by Dai Nippon Ink Chemical Industries Ltd.

Then, the obtained protective layer coating material was applied on top of the intermediate layer with a wire bar, and then dried in a furnace and then cured with ultraviolet radiation for 5 seconds under high pressure mercury lamp to give a 3 μm thick protective layer, to produce a reversibly changeable heat-sensitive recording medium.

Example 5

A heat-sensitive layer was prepared in the same manner as Example 2, except that the fluorescent dyestuff used in Example 2 (Lumogen F Red 300, manufactured by BASF) was omitted, and the following components were blended and dispersed in a small mixing vessel to produce an intermediate layer coating material.

| Component | Parts by weight (pbw) |
|---|---|
| vinyl chloride/vinyl acetate/hydroxypropyl acrylate copolymer* | 15 |
| Colonate HL** | 1.00 |
| MIBK | 42.5 |
| toluene | 42.5 |
| fluorescent dyestuff*** | 0.03 |

*Trade name SOLBINE TA-2, manufactured by Nissei Chemical Industries Ltd.
**Isocyanate cross-linking agent manufactured by Nippon Polyurethane Co., Ltd.
***Trade name Lumogen F Red 300, manufactured by BASF)

Then, the obtained intermediate layer coating material was applied on top of the heat-sensitive layer with a wire bar, and then dried in a furnace to give a 3 μm thick intermediate layer, which was cured at 60° C. for 24 hours. Additionally, a protective layer was prepared in the same manner as Example 4 to produce a reversibly changeable heat-sensitive recording medium.

Comparative Example 1

A heat-sensitive coating material was prepared in the same manner as Example 1, except that the fluorescent dyestuff used in the heat-sensitive coating material of Example 1 (Lumogen F Red 300) was omitted, and a reversibly changeable heat-sensitive recording medium was produced.

Comparative Example 2

A heat-sensitive coating material was prepared in the same manner as Example 1, except that in place of the fluorescent dyestuff used in the heat-sensitive coating material of Example 1 (Lumogen F Red 300), a red dyestuff (MS Magenta VP, manufactured by Mitsui Toatsu Co., Ltd,) was used, and a reversibly changeable heat-sensitive recording medium was produced.

Comparative Example 3

A reversibly changeable heat-sensitive recording medium was prepared in the same manner as in Comparative Example 1, only the heat-sensitive layer was prepared with a thickness of 10 μm.

Comparative Example 4

A heat-sensitive layer was prepared in the same manner as Example 5, except that in place of the fluorescent dyestuff used in Example 5 (Lumogen F Red 300), a fluorescent dyestuff which emits light absorbed from the ultraviolet spectrum (LUMINEX Red 335, manufactured by Hoechst) was used instead. Intermediate and protective layers were also prepared to produce a reversibly changeable heat-sensitive recording medium.

An image was formed on the surface of the reversibly changeable heat-sensitive recording media prepared in each of the Examples and Comparative Examples using a thermal head having an energy of 0.51 mJ/dot. The background was laid out using an aluminum foil or a white board and the optical density of the portions containing the image and those containing no image were measured on a MacBeth RD-915 densitometer (manufactured by Ogura Electric Co., Ltd). Also, for the measurement of the products of Examples 1, 2, 4, and 5 which used a red-colored fluorescent dyestuff, and the products of Comparative Examples 2 and 4 which used a red dyestuff, a cyanogen filter was used for the measurement of the optical density. For the same reason, a magenta filter was used for the measurement of the optical density of the product of Example 3.

The optical densities of the white board or aluminum foil used for the background are given in Table 1 below.

TABLE 1

| Background | Optical density |
|---|---|
| Aluminum foil | 1.256 |
| White board | 0.064 |

Additionally, the optical densities of the opaque and transparent portions when using aluminum foil are given in Table 2 below.

TABLE 2

| | Opaque portion | Transparent portion | Difference in density | Filter |
|---|---|---|---|---|
| Example 1 | 0.057 | 0.663 | 0.606 | cyanogen |
| Example 2 | 0.062 | 0.701 | 0.639 | cyanogen |
| Example 3 | 0.080 | 0.644 | 0.564 | magenta |
| Example 4 | 0.066 | 0.687 | 0.621 | cyanogen |
| Example 5 | 0.111 | 0.671 | 0.560 | cyanogen |
| Comparative Example 1 | 0.163 | 0.756 | 0.593 | none |
| Comparative Example 2 | 0.203 | 0.733 | 0.530 | cyanogen |
| Comparative Example 3 | 0.164 | 0.721 | 0.557 | none |
| Comparative Example 4 | 0.166 | 0.749 | 0.583 | cyanogen |

Additionally, the optical densities of the opaque and transparent portions when using white board are given in Table 3 below.

TABLE 3

| | Opaque portion | Transparent portion | Difference in density | Filter |
|---|---|---|---|---|
| Example 1 | 0.030 | 0.083 | 0.05 | cyanogen |
| Comparative Example 1 | 0.140 | 0.119 | −0.021 | none |
| Comparative Example 2 | 0.203 | 0.733 | −0.038 | cyanogen |

In Table 3, the values for the optical densities of the products of Example 1, and Comparative Examples 1 and 2 are given, and the values of the optical densities for the other Examples and Comparative Examples are not given. The reason for this is that, when using white board as a background, the difference between the optical density values is much smaller compared to using aluminum foil as the background, and with a heat-sensitive layer of a thickness of about 10 $\mu$m, there is a problem in getting clear experimental results. In Table 3, the differences in concentration for the more easily differentiated heat-sensitive layer thickness of 20 $\mu$m have been shown.

As can be clearly seen from Tables 2 and 3 above, the heat-sensitive recording medium obtained in Example 1 shows a greater concentration difference than those obtained in Comparative Examples 1 and 2. The heat-sensitive recording media obtained in Examples 2, 3, and 4 show a greater concentration difference than that obtained in Comparative Example 3. Furthermore, in the heat-sensitive recording medium obtained in Comparative Example 4, since little ultraviolet light was emitted by the lamp of the MacBeth densitometer, and a material which absorbs ultraviolet light was used as a protective layer, the effect of the invention was not achieved at all, and the difference in the concentration was of the same order as that for Comparative Example 2. On the other hand, the recording media obtained in Examples 4 and 5 had a large difference in the optical density without losing their efficacy. From this, we can see that the heat-sensitive recording media of the present invention has good visibility and can be used with backgrounds of any of many possible colors.

What is claimed is:

1. A reversibly changeable heat-sensitive recording medium comprising a support and a heat-sensitive layer which comprises a resin matrix and a low molecular weight organic material dispersed inside the resin matrix, the transparency of which changes reversibly depending on the temperature and which is formed on a support, and if necessary, including a protection layer or an intermediate layer prepared above the heat-sensitive layer or on the lower surface of the support layer or between the support layer and any other layer or between any other layers in the reversibly changeable heat-sensitive recording medium, wherein a fluorescent body which emits visible light after excitement by visible light is included in at least a portion of the support body, heat-sensitive layer and, if necessary, any other layer.

2. A reversibly changeable heat-sensitive recording medium as claimed in claim 1 wherein said fluorescent body is included in a concentration of not less than 0.001% and less than 10%.

* * * * *